Patented Feb. 7, 1950

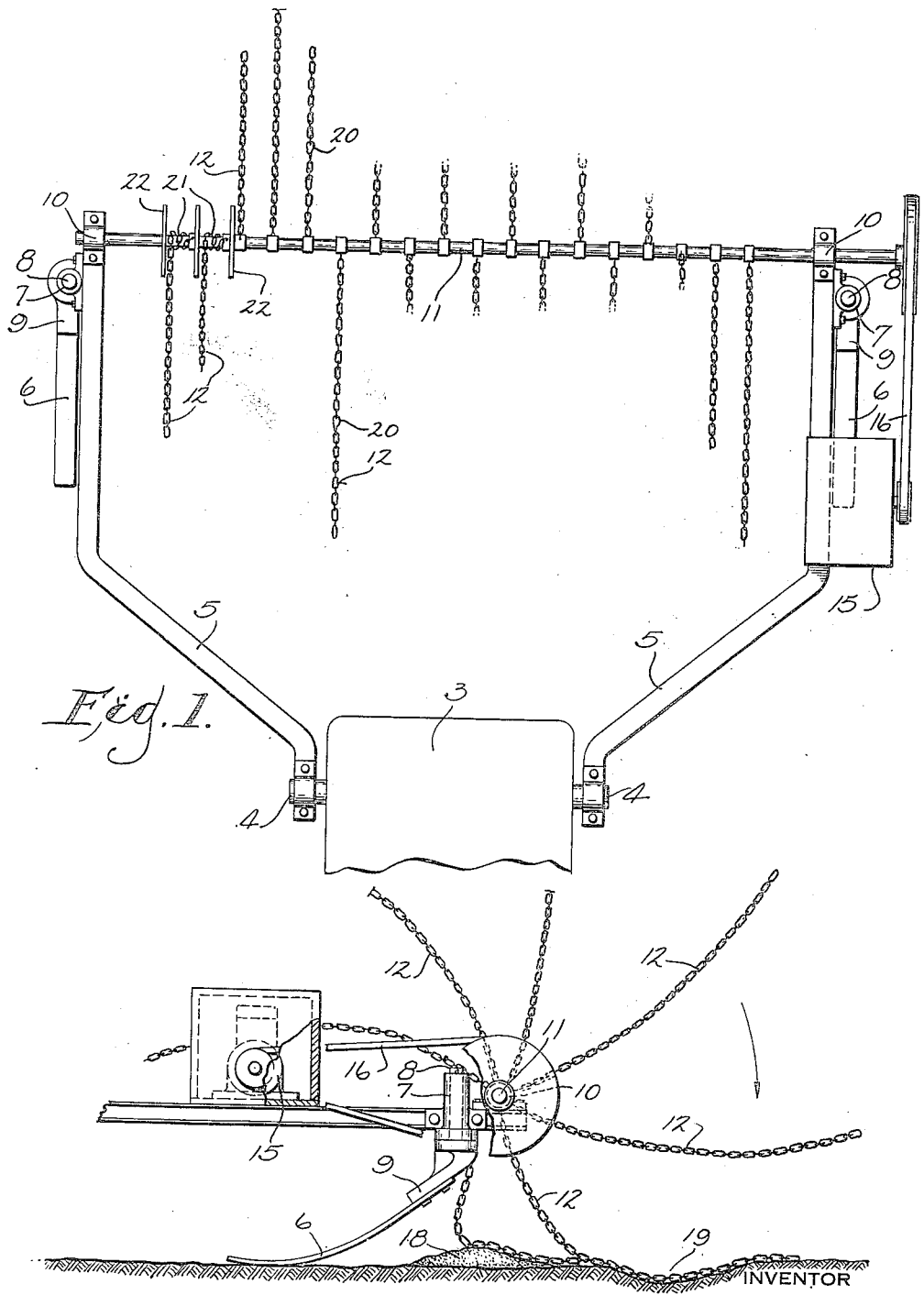

2,496,423

UNITED STATES PATENT OFFICE 2,496,423

SWEEPER FOR LAND MINES

William H. Taylor, Waukesha, Wis.

Application February 21, 1944, Serial No. 523,270

3 Claims. (Cl. 89—1)

This invention relates to a sweeper for land mines.

Experience has shown that land mines slow up an invasion force seriously. It is the object of the invention to provide a relatively safe and relatively economical way of exploding such mines in advance of an invasion force. More specifically, it is my purpose first, to assure the destruction of all mines within a strip of suitable width traversed by the sweeper and, secondly, to minimize the possibilities of damage to the equipment in the exploding of such mines and, thirdly, to facilitate the replacement of damaged portions of the equipment.

In the drawings:

Fig. 1 is a diagrammatic plan view.

Fig. 2 is a fragmentary diagrammatic side elevation of apparatus exemplifying the invention.

Like parts are identified by the same reference characters throughout the several views.

The propelling vehicle 3 is preferably a tank. It is noteworthy that no changes in the vehicle itself are required for the purposes of the invention, it being only necessary to add the trunnions 4 to which are pivoted the arms 5, which preferably diverge forwardly in order to cover a strip wider than the path of the propelling vehicle.

The arms 5 comprise a frame for the support of the sweeping mechanism. The frame may have its front end suspended by cable means from an overhead support on the tank. As shown, however, the forward ends of the arms 5 are flexibly supported by castered spring runners 6. These runners may be particularly susceptible to damage by exploding mines and hence I facilitate their whole or partial replacement. Socket brackets 7 on the forward end of each arm receive the pintle portions 8 of mounting members 9 to which the spring runners 6 are detachably connected, as shown in Fig. 2. The runners may be positively steered from the vehicle, if desired, but are preferably allowed to adjust themselves pivotally in response to movements of the arms 5 as the vehicle is turned this way or that.

The forward ends of the respective arms carry bearings at 10 for the sweeper shaft 11. Connected at their ends to shaft 11 are the lengths 12 of chain which serve as flails to explode land mines. Shaft 11 may be driven in any convenient way. If the vehicle has adequate electric power available, such power may be communicated to a prime mover at 15 connected by chain or belt 16 with shaft 11. If the supply of electric power available is inadequate, the prime mover 15 may comprise an ordinary internal combustion engine. It is located at a sufficient distance rearwardly along one of the arms 5 to minimize chance of injury to it, but is preferably made to be readily replaced in the event of damage. Because a chain is more susceptible to injury from flying debris than is a set of V-belts, it is preferred that a belt drive be used for propelling shaft 11 from the prime mover. It is contemplated that power might be applied to shaft 11 directly from the vehicle 3. This, however, might involve changes to the vehicle and one of the objects of the invention is to make a self-contained sweeping unit applicable to any vehicle.

Fig. 2 illustrates diagrammatically how the flailing chains will operate with respect to relatively rough terrain. The surface to be traversed may have hillocks, as at 18, or depressions as at 19. The length of each chain will preferably be in excess of the distance between the shaft and the ground. Consequently, each time a chain is thrown against the earth, its free end will conform itself to the surface of the ground for a considerable distance either overlying a hillock as at 18 or entering a depression as at 19.

In the event that a portion of any chain is blown off, spare lengths of chain can readily be supplied to attach to any links which may remain in connection with the shaft 11. Connecting links 20, similar to those used in tire chains, can be used to hook on additional chain as required.

However, it is not even necessary to stop the apparatus for the purpose of supplying additional chain. It is a peculiar phenomenon that if surplus chain is wound as at 21 on such a shaft as that here disclosed, the chain will always feed itself out to approximately the length indicated in Fig. 2. The shaft will always automatically take up any surplus and, if part of the chain is blown away, an additional amount of chain will automatically be unwound from the shaft to replace that which has been lost. Where surplus chain is wound on the shaft, as suggested at 21, two adjacent lengths of chain should preferably be separated as by disks at 22, it being understood that all of the chains for the whole length of the shaft may be similarly wound and separated with disks, if desired.

It will be evident that the entire apparatus is relatively light, flexible and adaptable to any available vehicles and that little damage to its parts is likely under ordinary circumstances. The mines commonly used are understood to have a very limited range so far as tanks are concerned. Consequently, the occupants of the propelling tank 3 will be relatively secure, for the arms 5 may be made sufficiently long so that the mines will be exploded as much as fifteen or twenty or more feet in advance of the tank. It is contemplated that the tank will advance at a rate of perhaps four or five miles an hour, the shaft 11 being rotated at a speed sufficient to throw the chains centrifugally outwardly in the manner indicated in Fig. 2. Almost every square inch of ground will be struck by the chains, not once, but several times, before being traversed by the propelling tank. Experience will quickly show how high above the ground the shaft 11 should be mounted to minimize damage from ordinary mines. Even as much as ten feet would be practical, and less height should be sufficient.

A major advantage lies in the fact that the entire apparatus other than the tank and the prime mover 15 can be made of cheap, readily available material and built with a minimum of preparation at a high rate of output.

I claim:

1. A sweeper for land mines comprising frame arms provided with pivotal mountings for connection with a propelling vehicle, said arms being disposed to extend forwardly of the vehicle, castered supports for the forward ends of the arms, bearings carried by the arms, a shaft extending transversely between the arms and rotatable in the bearings, chains connected with the shaft, and means including a prime mover connected with at least one of the frame arms and provided with driving connections for the actuation of said shaft at a speed such as to distend the respective chains centrifugally, the length of the chains exceeding the height of the shaft from the surface traversed, whereby the chains will flail such surface in advance of the movement of the shaft.

2. A sweeper for land mines comprising a shaft, means supporting the shaft for movement on a given path of travel and in a position such that the shaft is disposed transversely respecting its path of travel, means for rotating the shaft in the course of its movement on such path, and a set of flexibly jointed flails connected with the shaft and having substantial lengths of the flails wound upon the shaft during operation of the sweeper and free end portions of the flails constructed and arranged to strike the earth in advance of the shaft in the course of shaft rotation.

3. The device of claim 2 in which the supporting means for the shaft comprises frame arms extending rearwardly therefrom and constructed and arranged for connection with a propelling vehicle.

WILLIAM H. TAYLOR.

REFERENCES CITED

The following references are of record in the file of this patent:

UNITED STATES PATENTS

| Number | Name | Date |
|---|---|---|
| 1,035,056 | Shubert et al. | Aug. 6, 1912 |
| 1,263,965 | Twitchel | Apr. 23, 1918 |
| 1,505,572 | McDonald | Aug. 19, 1924 |
| 1,542,963 | Russell | June 23, 1925 |

FOREIGN PATENTS

| Number | Country | Date |
|---|---|---|
| 205,310 | Great Britain | Oct. 18, 1923 |